United States Patent [19]

Tamulevich

[11] Patent Number: 4,904,044
[45] Date of Patent: Feb. 27, 1990

[54] CONTINUOUSLY VARIABLE FIBER OPTIC ATTENUATOR

[75] Inventor: Thomas W. Tamulevich, Chelmsford, Mass.

[73] Assignee: Light Control Systems, Inc., Tyngsboro, Mass.

[21] Appl. No.: 241,606

[22] Filed: Sep. 8, 1988

[51] Int. Cl.$^4$ .................................................. G02B 6/32
[52] U.S. Cl. ............................ 350/96.18; 350/96.15; 350/96.21
[58] Field of Search ............ 350/311, 314, 315, 96.18, 350/96.2, 96.15, 96.16, 96.21

[56] References Cited

U.S. PATENT DOCUMENTS

| | | | |
|---|---|---|---|
| 3,893,753 | 7/1975 | Glenn | 354/241 |
| 4,145,110 | 3/1979 | Szentesi | 350/96.15 |
| 4,186,995 | 2/1980 | Schumacher | 350/96.2 |
| 4,190,316 | 2/1980 | Malsby et al. | 350/96.18 |
| 4,257,671 | 3/1981 | Barbaudy et al. | 350/96.15 |
| 4,302,069 | 11/1981 | Niemi | 350/96.18 X |
| 4,364,639 | 12/1982 | Sinclair et al. | 350/96.15 |
| 4,591,231 | 5/1986 | Kaiser et al. | 350/96.18 |
| 4,639,078 | 1/1987 | Sheem | 350/96.21 |
| 4,645,294 | 2/1987 | Oguey et al. | 350/96.15 |
| 4,664,484 | 5/1987 | Hines | 350/394 |
| 4,695,125 | 9/1987 | Sinclair et al. | 350/96.2 |
| 4,697,869 | 10/1987 | So et al. | 350/96.15 |
| 4,702,549 | 10/1987 | Duck et al. | 350/96.15 |
| 4,717,234 | 1/1988 | Barlow et al. | 350/96.21 |

OTHER PUBLICATIONS

Proceedings of the Sociey of Photo-Optical Instrumentation Engineers Seminar on Fiber Optic Come of Age, vol. 31, San Mateo, Calif., U.S.A. (16-17), Oct. 1972; Jack B. Weilar; "Plastic Optical Fibers"; pp. 3-11.

*Primary Examiner*—John D. Lee
*Assistant Examiner*—John Ngo
*Attorney, Agent, or Firm*—Hamilton, Brook, Smith & Reynolds

[57] ABSTRACT

A continuously variable fiber optic attenuator which can be constructed in a size amenable to direct mounting on optical data application apparatus is presented. The attenuator utilizes a flexible filter of varying optical density which is oriented in an optical coupling region between two optical fibers. The filter can be displaced in a manner to vary the filter density in the optical coupling region and thereby vary the attenuation across the device. A resistor coupled to the attenuator provides means for calibration of the attenuator to provide a highly accurate and reproducible attenuation.

26 Claims, 1 Drawing Sheet

CONTINUOUSLY VARIABLE FIBER OPTIC ATTENUATOR

BACKGROUND OF THE INVENTION

The use of optical fibers in fiber optic transmission systems has prompted the use of single fiber attenuators which allow high power transmission signals to be processed directly into signal application apparatus. In the past, such attenuators have reduced signal levels by transmitting such signals through partially opaque optical filters, by obstructing a section of the signal with attenuation filter segments, by varying the orientation between signal input and output fibers, or by diminishing signal strength via reflection from partially light absorbent elements.

For example, in U.S. Pat. No. 4,591,231, Kaiser et al. describe an optical attenuator containing a disk having a plurality of openings with fixed, neutral density filters of differing optical density contained therein. By rotating the disk, a fixed density filter of a desired opacity can be introduced into the signal path, thereby attenuating a portion of the signal. Although effective for reducing signal strength, such a system is limited in that attenuation levels vary in a step-wise rather than a continuous manner.

U.S. Pat. No. 4,702,549 to Duck et al. teaches a variable attenuator in which an attenuation filter is used to obstruct a segment of the transmission signal. Such attenuators tend to suffer from internal refraction and reflection problems, thereby resulting in high signal noise which reduces the effectiveness of the device.

Attenuators in which the orientation between signal input and output fibers is varied have been described in U.S. Pat. No. 4,645,294 to Oguey et al. and in U.S. Pat. No. 4,145,110 to Szentesi. In the former patent, a first optical fiber is mounted in a fixed position, while a second optical fiber is mounted on a movable surface in a manner which allows its terminal end to be moved in a circular arc about the terminal end of the fixed fiber. In the latter patent, the terminal ends of the signal input and output fibers are mounted in an apparatus which allows the axial distance between the terminal ends to be varied.

Reflective means to vary signal attenuation have been described in U.S. Pat. No. 4,664,484 to Hines and in U.S. Pat. No. 4,364,639 to Sinclair et al. This latter patent also describes the use of a liquid crystal cell to vary the transmissity of a medium through which the transmission signal passes.

Additionally, means for providing fixed attenuation are well known in the art. Such systems generally utilize a medium of fixed optical density disposed between a signal input fiber and a signal output fiber. These media can comprise isolated material placed between the signal carrying fibers as described in U.S. Pat. No. 4,257,671 to Barbaudy et al., or can comprise a coating upon the terminal end of at least one of the signal carrying fibers as described in U.S. Pat. No. 4,639,079 to Sheem.

SUMMARY OF THE INVENTION

The present invention pertains to an optical attenuator useful for reducing optical signal strength at one end of a fiber optic transmission fiber. More particularly, the invention comprises a first optical lens coupled to a connector by an optical fiber. A second optical lens, in optical communication with the first lens, is coupled to a second connector. A variable density optical filter is disposed between the two lenses preferably in a substantially vertical manner and serves to absorb a portion of the light being transmitted between the lenses. The filter is operably connected to a reciprocating means which provides a vehicle for vertical displacement of the filter. By displacing the filter in this manner, an operator can provide filter regions of differing optical density between the lenses to thereby vary the attenuation characteristic of the device. In one embodiment, the reciprocating means comprises a variable resistor. Thus, by measuring the resistance value of the resistor and comparing this value to the level of attenuation (or alternatively, transmittance) across the device, the device can be readily calibrated to provide highly accurate and reproducible attenuation values.

The present invention provides a variable optical attenuator which can be constructed in a manner which allows simple integration into current fiber optic application apparatus. The invention also provides a low cost unit, of relatively simple construction which can be field adjusted with a minimum of difficulty to provide desired attenuation levels.

DETAILED DESCRIPTION OF THE INVENTION

Figure 1:
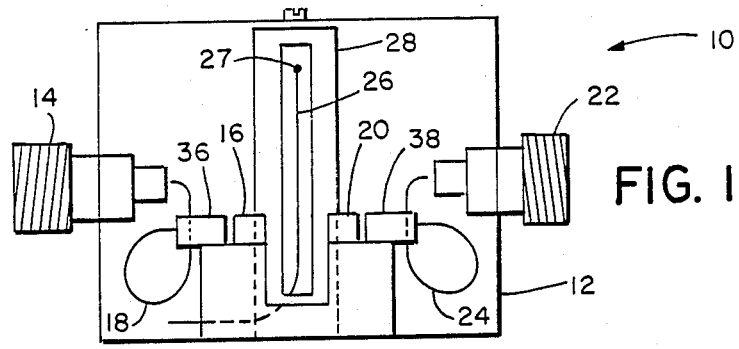
FIG. 1 is a schematic representation of the continuously variable fiber optic attenuator of the present invention.

The continuously variable optical attenuators of the present invention are depicted schematically in FIG. 1. In this Figure, the optical attenuator 10 comprises a housing 12, containing a first optical fiber connector 14, a first optical lens 16, a first connecting optical fiber 18, a second optical lens 20 separated from the first optical lens 16 by an optical coupling region, a second optical fiber connector 22, a second connecting optical fiber 24, an optical filter 26 and a reciprocating means 28. Each of the connecting optical fibers 18 and 24 serves to couple its corresponding connector to its corresponding lens, to thereby provide optical communication therethrough. The connecting optical fibers allow the optical fiber connectors to be oriented in any manner which is desirable for the overall package design. This is because the fibers 18 and 24 allow movement between the lens and connector even if the lens is to be maintained in a fixed, precise position. By allowing the fiber connectors 14 and 22 to be located off the axis of the optical coupling region, design flexibility is achieved. Furthermore, by mounting connectors 14 and 22 directly on housing 12, the likelihood of device damage by a steady or sudden tension applied to one or both of the connectors is greatly diminished. By using connecting fibers 18 and 24 between each connector and lens, each of the optical lenses can be maintained in optical alignment to thereby allow optical communication between the first lens 16 and the second lens 20 despite nonalignment between connectors 14 and 22. In one embodiment, the lenses comprise gradient index lenses. Such lenses generally comprise glass rods subjected to doping using a variety of ions to provide an index of refraction which varies through the lens cross section. Alternatively, the lenses can comprise aspherical lenses. In the preferred embodiment, however, the lenses comprise spherical, ball lenses. Although such ball lenses have been suggested for optical fiber applications, prior to the present invention, their use has proven less than satisfactory.

Although a variety of means for mounting connecting optical fibers 18 and 24 within the device can be used, the preferred method is to terminate the fibers in fiber positioning sleeves 36 and 38 which are mounted to maintain the fibers in proper alignment. This method is preferred, since precise positioning of the sleeves 36 and 38 is simpler than precise positioning of exposed connecting fibers 18 and 24. As such, the use of fiber positioning sleeves 36 and 38 enhances the ease of manufacturing the device.

The optical filter 26 is a flexible film having an optical density gradient which varies along its length. Although, in the preferred embodiment the filter has neutral density (i.e., it absorbs light over virtually the entire visible spectrum), the invention is not intended to be so limited. Rather, any of a variety of chromatic filtering schemes can be suitable for use in the present invention. The filter 26 is preferably mounted in an orientation which is substantially orthogonal to the optical axis within the optical coupling space between each of the lenses 16 and 20. Although in the past it has been suggested that the filter be maintained nonorthogonally to the optical axis to minimize back reflection, the present system of separate lenses 16 and 20 is believed to eliminate the need to do so Additionally, antireflection coatings can be used on the lenses and filter to further reduce back reflection.

The filter should be of a length long enough to allow top and bottom portions of said filter to extend beyond the periphery of each lens. This allows the filter to be moved in a manner which varies the filter density in the optical coupling region without the risk of withdrawing the filter from the optical coupling region. The filter 26 is operably connected to the reciprocating means 28 in order to vary the vertical position of the filter within the optical coupling space between lenses 16 and 20. As the density of the filter is a gradient along its length, such vertical movement serves to provide areas or regions of differing optical density disposed in the optical coupling space between the lenses. This differing optical density region transmits and absorbs differing amounts of light, thereby providing a continuously variable filter means between the lenses. By varying the vertical position of the filter, the degree of light attenuation across the device can be varied.

In a preferred embodiment, the reciprocating means 28 is a linear or logarithmic variable resistor having a sliding member which can be translated along a length of resistance coil. By operably connecting the filter 26 to the sliding member of the variable resistor, such as with pin 27, the filter is caused to be vertically displaced as the position of the sliding member is altered by external adjustment of the resistor. Thus, adjustment of the variable resistor causes displacement of the filter and, therefore, variation in the attenuation characteristic in the optical coupling regions between the lenses.

The use of a variable resistor as a reciprocating means allows a simple method for determining attenuation via resistance measurement. A calibration curve can be determined either during manufacture or thereafter to compare the attenuation to the resistance value of the variable resistor. The device attenuation can then be simply determined using an ohmmeter and the predetermined calibration curve. Thus, as the variable resistor is adjusted, as in field use, a highly accurate and reproducible attenuation across the device can be produced.

Figure 2:
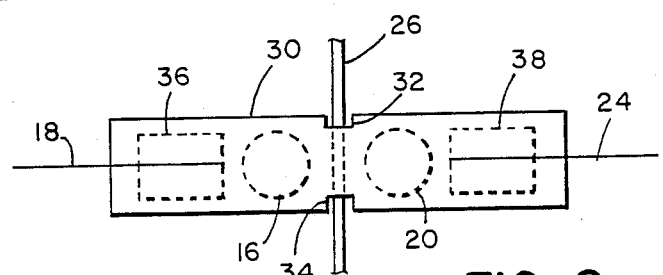
FIG. 2 is a schematic representation of an optical alignment system useful with the continuously variable fiber optic attenuator of the present invention.

The lenses are preferably maintained in optical alignment by the structure schematically depicted in FIG. 2. In this Figure a ferrule 30 having two radially opposite openings 32 and 34 along its axial length serves as an alignment means for the lenses 16 and 20. Each of the connecting fibers 18 and 24 is preferably terminated in fiber positioning sleeves 36 and 38 to maintain each in alignment with its corresponding lens. The radially opposite openings 32 and 34 provide a passage through the ferrule 30 through which the filter 26 travels. Additionally, said openings serve to maintain the filter in the preferred substantially orthogonal orientation in the region between the lenses. Although the use of ferrule and fiber positioning sleeves is preferred, it must be pointed out that such an apparatus is not intended to be limiting. Rather, any method which maintains the filter in a substantially orthogonal orientation to the optical axis between the optically aligned fibers and lenses is intended to be included herein.

The lenses 16 and 20 are preferably either spherical, ball lenses or gradient index lenses of a size amenable to use on the scale of single optical fibers. The lenses are also preferably antireflection coated to minimize losses and noise resulting from light reflection within the device. In a most preferred embodiment, the first connecting optical fiber has a terminal end which is positioned within the focal length of the first lens. Such a positioning results in a collimated, parallel light beam exiting the first lens and traveling through the optical coupling region. Upon encountering the second lens, the collimated, parallel light beam is converted into an extended, narrow focusing cone upon exiting the second lens. Since the focusing cone is extended, the positioning of the terminal end of the second connecting fiber is allowed a large variability without unsatisfactory losses. Such a configuration reduces the required accuracy of fiber positioning and therefore enhances the ease of manufacturing the device. Again, although such a configuration is preferred, the device is not intended to be so limited. Since placement of the first connecting optical fiber within the focal length of the first lens results in a collimated, parallel light beam exiting that lens, the placement of the second lens is allowed a large variation. For example, a distance between the lenses of up to about 20 mm is not expected to significantly decrease device performance. In the preferred embodiment, however, the lenses spacing is less than about 0.5 mm.

The filter is preferably a flexible polymeric film having a gradient optical density which varies along its length. In the preferred embodiment, the filter is of neutral density, however, in some applications chromatic filters are desirable. An optical density which varies in a linear manner from one peripheral end of the film to the other is most preferred. Such a filter is readily available from a number of commercial suppliers. By providing a filter which is flexible, filter sections which are not located within the optical coupling region for a given attenuation can be bent out of the orthogonal orientation to the optical axis. This allows further minimization of the device package size. the dimensions of the attenuator housing can be minimized, thereby providing an attenuator which is more favorably suited to direct mounting on optical data application apparatus than the attenuators of the prior art. The flexible nature of the filter is apparent in FIGS. 1 and 2, in which filter 26 is seen to be bent and horizontally displaced in an area below the optical coupling region between the lenses. Alternatively, the filter can consist of optically transparent and opaque regions, the proportion of which vary over the vertical length of the filter. Although such a filter will provide a variable attenuation along its vertical length, such configurations are suspected of causing decreased attenuator performance as a result of light refraction within the device.

In the preferred embodiment, the lenses and filter have an anti-reflective coating thereon. This coating serves to minimize back reflection within the device, providing therefore enhanced device performance. Furthermore, the use of the separate lenses 16 and 20 is believed to further reduce back reflection within the device.

The optical fiber connectors 14 and 22 can be any combination of standard male or female optical fiber connectors with the device application determining the variety to be provided. As such, the device can have two male connectors, two female connectors or one each of a male and a female connector. Alternatively, any connector means, such as a pigtail or an optical fiber splice can be used.

Figure 3:
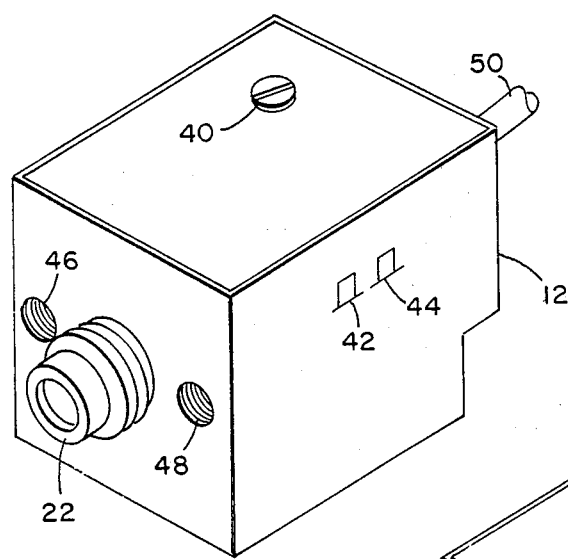
FIG. 3 is a schematic representation of an external view of one embodiment of the present invention.

FIG. 3 is a representation of a typical continuously variable fiber optic attenuator of the present invention. In FIG. 3, a housing 12, comprising any structural material, but preferably aluminum or thermoplastic is utilized to contain the apparatus. One of the fiber optic connectors 22 is seen to exit one wall of the device. The other fiber optic connector exits the housing through the wall opposite that of connector 22. In this representation, the fiber optic connector exiting the rear wall of the attenuator is obstructed from view, however, a section of fiber optic cable 50, which is attached to the connector is shown. The reciprocating means is varied by rotating adjustment screw 40, in either a clockwise or counterclockwise manner. In the embodiment in which the reciprocating means is a variable resistor, resistor contacts 42 and 44 exit the housing 12 in order to allow determination of the resistance value for calibration or attenuation adjustment purposes. In one embodiment, the housing 12 includes screw holes 46 and 48 which allow the housing to be firmly mounted to optical fiber application apparatus. The number and orientation of screw holes can be varied depending upon the specific apparatus to which the attenuator is to be affixed. Alternatively, the screw holes can be supplemented or replaced by mounting lugs. In yet another embodiment the attenuator can be mounted via adhesives, brackets, hook and loop fabric or other standard attachment means.

Figure 4:
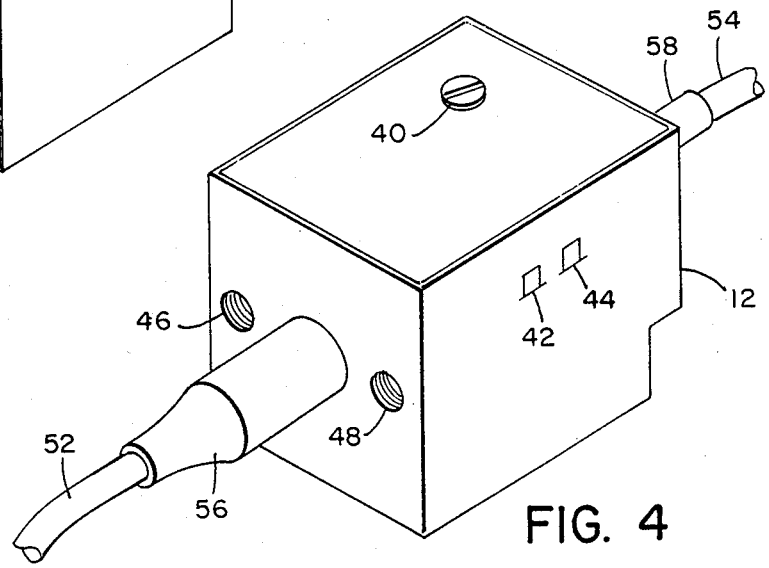
FIG. 4 is a schematic representation of an external view of a second embodiment of the present invention.

FIG. 4 is a representation of another embodiment of a typical continuously variable fiber optic attenuator of the present invention. In FIG. 4, the housing 12, the adjustment screw 40, the resistor contacts 42 and 44, and the screw holes 46 and 48 are and operate as previously described. In this embodiment, however, optical fiber cables 52 and 54 are coupled directly into the attenuator as pigtails. Sleeves 56 and 58 of either a flexible or rigid material serve to position the cables 52 and 54 as they enter housing 12. In this embodiment, the first and second optical fiber connectors, as well as the first and second connecting optical fibers are eliminated. Rather, the optical fiber contained within each pigtail cable is oriented in direct optical communication with its corresponding lens. In such an embodiment, the optical fiber cable is not demountable from the attenuator at the attenuator housing. As before, the attenuator of this embodiment can be mounted to optical fiber application apparatus by alternate means such as mounting lugs, adhesives, brackets, hook and loop fabric or other standard attachment means.

It should be pointed out that the embodiments presented in FIGS. 3 and 4 are not intended to limit the attenuator to the specific cable attachment means presented. Rather, the attenuators of the present invention can be fabricated having any combination of male connectors, female connectors and pigtails.

The embodiments of FIGS. 3 and 4 are particularly useful in conjunction with optical fiber application apparatus such as fiber distribution units manufactured by ADC Telecommunications, NEC, AT&T, GTE, Telect and others. This is a result of the small device size, the ease with which the device may be added to or removed from the optical system, the ease with which the device can be adjusted to a desired attenuation value, and the ease in mounting and demounting the devices from the equipment.

The variable optical attenuators of the type described herein preferably provide a continuously variable attenuation over the range of about −3 to about −30 dB. They are expected to operate within the range of between about 0 to about 50° C. however, these temperatures are not intended to limit the device. Such devices can be constructed to be compatible with both single mode and multimode optical fibers depending upon their intended application. Finally, they are intended to be compatible with most commercially available fiber distribution panels, fiber splice boards and panel mounts for fiber optic equipment.

Equivalents

Those skilled in the art will recognize or be able to ascertain, using no more than routine experimentation, many equivalents to the specific embodiments of the invention described herein. Such equivalents are intended to be encompassed in the following claims.

I claim:

1. A continuously variable optical attenuator apparatus for attenuating an optical signal between a first optical fiber and a second optical fiber, said apparatus comprising:
   a. a housing having means for attachment to fiber optical application apparatus;
   b. a first optical lens;
   c. means for allowing the first optical fiber to communicate with said first optical lens;
   d. a second optical lens in optical communication with the first lens along an axis of alignment;
   e. means for allowing the second optical fiber to communicate with said second optical lens;
   f. a flexible optical filter disposed between said first and second lenses and extending beyond the periphery of each lens, the optical filter having a density gradient which varies along the length of the filter; and
   g. a reciprocating means operably connected to said optical filter, said reciprocating means allowing movement of the optical filter to thereby provide a continuously variable optical filter density between the lenses, the flexible filter following a curved path to at lest one side of the lenses.

2. The apparatus of claim 1 additionally comprising a ferrule, said ferrule comprising a hollow cylinder having two radially opposite openings along its axial length through which the optical filter can travel, said ferrule maintaining said lenses in optical alignment and said optical filter oriented in the axis of alignment between the lenses.

3. The apparatus of claim 1 wherein the filter is maintained in a substantially orthogonal orientation to the axis of alignment between the lenses.

4. The apparatus of claim 1 wherein at least one of said optical lenses comprises a spherical, ball lens.

5. The apparatus of claim 1 wherein at least one of said optical lenses comprises a gradient index lens.

6. The apparatus of claim 1 wherein the reciprocating means comprises a variable resistor.

7. The apparatus of claim 1 wherein the density gradient of the optical filter varies in a linear manner.

8. The apparatus of claim 7 wherein the density gradient has an optical transmittance varying from about 0 to about 100%.

9. The apparatus of claim 1 wherein the optical filter comprises a gradient, neutral density filter.

10. The apparatus of claim 1 wherein one of said optical fibers has a terminal end located within the focal length of its corresponding lens.

11. A continuously variable optical attenuator apparatus which comprises:
   a. a housing having means for attachment to fiber optical application apparatus;
   b. a first optical fiber connector;
   c. a first optical lens;
   d. a first optical fiber disposed between said first optical fiber connector and said first optical lens to allow optical communication between said first lens and said first connector;
   e. a second optical lens in optical communication with the first lens along an axis of alignment;
   f. a second optical fiber connector;
   g. a second optical fiber disposed between said second optical fiber connector and said second optical lens to allow optical communication between said second lens and said second connector;
   h. an optical filter disposed between said first and said second lenses and extending beyond the periphery of each lens, the optical filter having a density gradient which varies along the length of the filter;
   i. a reciprocating means operably connected to said optical filter, said reciprocating means allowing movement of the optical filter to thereby provide a continuously variable optical filter density between the lenses; and
   'j. a ferrule, said ferrule comprising a hollow cylinder having two radially opposite openings along its axial length through which the optical filter can travel, said ferrule maintaining said lenses in optical alignment and said optical filter oriented in the axis of alignment between the lenses.

12. The apparatus of claim 11 wherein the filter is maintained in a substantially orthogonal orientation to the axis of alignment between the lenses.

13. The apparatus of claim 11 wherein at least one of said optical lenses comprises a spherical, ball lens.

14. The apparatus of claim 11 wherein at least one of said optical lenses comprises a gradient index lens.

15. The apparatus of claim 11 wherein the reciprocating means comprises a variable resistor.

16. The apparatus of claim 11 wherein at least one of said optical fiber connectors comprises a female connector.

17. The apparatus of claim 11 wherein at least one of said optical fiber connectors comprises a male connector.

18. The apparatus of claim 11 wherein the density gradient of the optical filter varies in a linear manner.

19. The apparatus of claim 18 wherein the density gradient has an optical transmittance varying from about 0 to about 100%.

20. The apparatus of claim 11 wherein the optical filter comprises a gradient, neutral density filter.

21. The apparatus of claim 11 wherein one of said optical fibers has a terminal end located within the focal length of its corresponding lens.

22. The apparatus of claim 11 wherein the optical filter is a flexible filter which follows a curved path to at least one side of the lenses.

23. A continuously variable optical fiber attenuator for use with fiber optical application apparatus, said attenuator comprising:
   a. a housing having means for attachment to fiber optical application apparatus;
   b. a first optical fiber connector;
   c. a first spherical, ball lens having an antireflection coating thereon;
   d. a first optical fiber disposed between said first optical fiber connector and said first spherical, ball lens to allow optical communication between said first spherical, ball lens and said first connector;
   e. a second spherical, ball lens having an antireflection coating thereon, said second spherical, ball lens in optical communication with said first spherical, ball lens along an axis of alignment;
   f. a second optical fiber connector;
   g. a second optical fiber disposed between said second optical fiber connector and said second spherical, ball lens to allow optical communication between said second spherical, ball lens and said second connector;
   h. a flexible, polymeric filter having an antireflection coating thereon, said polymeric filter disposed between said first and second spherical, ball lenses and extending beyond the periphery of each spherical, ball lens, the polymeric filter having a density gradient which varies along its vertical length;
   i. a reciprocating means operably connected to said polymeric filter, said reciprocating means allowing movement of the polymeric filter to provide a continuously variable optical filter density between the spherical, ball lenses; and,
   j. a ferrule comprising a hollow cylinder having two radially opposite openings along its axial length through which the polymeric filter can travel, said ferrule maintaining the spherical, ball lenses in optical alignment and said polymeric filter oriented in the axis of alignment between the spherical, ball lenses.

24. A continuously variable optical attenuator for attenuating an optical signal between a first optical fiber and a second optical fiber comprising:
   a flexible optical filter disposed in an optical path between first and second optical fibers, the optical filter having a density gradient which varies along the length of the filter; and means for reciprocating the optical filter to provide a continuously variable optical filter density in the optical path, the flexible filter following a curved path to at least one side of the optical path.

25. An attenuator as claimed in claim 24 further comprising:
   a first optical fiber connector;
   a first optical fiber disposed between the first optical fiber connector and the optical path through the attenuator to allow optical communication between the first connector and the filter;
   a second optical fiber connector; and
   a second optical fiber disposed between the second optical fiber connector and the optical filter to allow optical communication between the second optical fiber connector and the filter.

26. An attenuator as claimed in claim 25 further comprising a ferrule, the ferrule comprising a hollow cylinder having radially opposite openings through which the optical filter reciprocates, the ferrule maintaining the first and second optical fibers in alignment.

* * * * *